United States Patent
Zhang et al.

(10) Patent No.: US 11,493,734 B2
(45) Date of Patent: Nov. 8, 2022

(54) CAMERA LENS ASSEMBLY INCLUDING FIVE LENSES OF +−++− OR +−−+− REFRACTIVE POWERS

(71) Applicant: ZHEJIANG SUNNY OPTICAL CO., LTD, Ningbo (CN)

(72) Inventors: Kaiyuan Zhang, Ningbo (CN); Ming Li, Ningbo (CN); Lin Yang, Ningbo (CN)

(73) Assignee: ZHEJIANG SUNNY OPTICAL CO., LTD

( * ) Notice: Subject to any disclaimer, the term of this patent is extended or adjusted under 35 U.S.C. 154(b) by 16 days.

(21) Appl. No.: 16/076,188

(22) PCT Filed: Jan. 18, 2018

(86) PCT No.: PCT/CN2018/073168
§ 371 (c)(1),
(2) Date: Aug. 7, 2018

(87) PCT Pub. No.: WO2018/227971
PCT Pub. Date: Dec. 20, 2018

(65) Prior Publication Data
US 2021/0181469 A1    Jun. 17, 2021

(30) Foreign Application Priority Data

Jun. 13, 2017 (CN) .......................... 201710443540.0
Jun. 13, 2017 (CN) .......................... 201720682644.2

(51) Int. Cl.
 *G02B 13/00* (2006.01)
 *G02B 9/60* (2006.01)
 *G02B 13/02* (2006.01)

(52) U.S. Cl.
 CPC ........... *G02B 13/0045* (2013.01); *G02B 9/60* (2013.01); *G02B 13/02* (2013.01)

(58) Field of Classification Search
 CPC ....... G02B 13/0045; G02B 9/60; G02B 13/02
 See application file for complete search history.

(56) References Cited

U.S. PATENT DOCUMENTS

| | | | |
|---|---|---|---|
| 10,732,388 B2 * | 8/2020 | Hashimoto | ........ G02B 13/0045 |
| 2015/0146306 A1 * | 5/2015 | Yonezawa | .......... G02B 13/0045 |
| | | | 359/714 |

(Continued)

FOREIGN PATENT DOCUMENTS

| | | |
|---|---|---|
| CN | 101819315 A | 9/2010 |
| CN | 101846792 A | 9/2010 |

(Continued)

OTHER PUBLICATIONS

Evaluation Report of Utility Model Paten, dated Aug. 9, 2021, 10 pages.

*Primary Examiner* — Wen Huang
(74) *Attorney, Agent, or Firm* — Barnes & Thornburg LLP

(57) ABSTRACT

The present disclosure discloses a camera lens assembly. The camera lens assembly includes, sequentially from an object side to an image side, a first lens, a second lens, a third lens, a fourth lens, and a fifth lens. The first lens has a positive refractive power. The second lens has a negative refractive power. The third lens has a positive refractive power or a negative refractive power. The fourth lens has a positive refractive power. The fifth lens has a negative refractive power. An effective focal length f of the camera lens assembly and a combined focal length f45 of the fourth lens and the fifth lens satisfy: $-1.0<f/f45\leq-0.5$. The camera lens assembly according to the present disclosure is an ultra-thin telephoto lens assembly structure having 5 lenses and high pixels, which may obtain a good image quality and a good processing and manufacturing performance.

15 Claims, 7 Drawing Sheets

(56) References Cited

U.S. PATENT DOCUMENTS

| | | | |
|---|---|---|---|
| 2015/0198789 A1* | 7/2015 | Tanaka | G02B 3/04 359/714 |
| 2015/0247991 A1 | 9/2015 | Kubota et al. | |
| 2015/0253647 A1 | 9/2015 | Mercado | |
| 2016/0109687 A1 | 4/2016 | Son | |
| 2016/0139372 A1 | 5/2016 | Tanaka | |
| 2016/0266353 A1* | 9/2016 | Teraoka | G02B 9/60 |
| 2017/0003482 A1 | 1/2017 | Chen | |
| 2018/0052307 A1* | 2/2018 | Sekine | G02B 13/0045 |
| 2018/0188501 A1* | 7/2018 | Lee | G02B 13/0045 |
| 2019/0258030 A1* | 8/2019 | Chen | G02B 27/0025 |

FOREIGN PATENT DOCUMENTS

| | | |
|---|---|---|
| CN | 102132188 A | 7/2011 |
| CN | 201903684 U | 7/2011 |
| CN | 202256845 U | 5/2012 |
| CN | 102540405 A | 7/2012 |
| CN | 202362524 U | 8/2012 |
| CN | 103135205 A | 6/2013 |
| CN | 103293638 A | 9/2013 |
| CN | 103309021 A | 9/2013 |
| CN | 203773141 U | 8/2014 |
| CN | 203773145 U | 8/2014 |
| CN | 104216096 A | 12/2014 |
| CN | 204028446 U | 12/2014 |
| CN | 204129315 U | 1/2015 |
| CN | 105988186 A | 10/2016 |
| CN | 106646829 A | 5/2017 |
| CN | 106646833 A | 5/2017 |
| CN | 106990508 A | 7/2017 |
| CN | 106990511 A | 7/2017 |
| CN | 107085284 A | 8/2017 |
| CN | 206773280 U | 12/2017 |

* cited by examiner

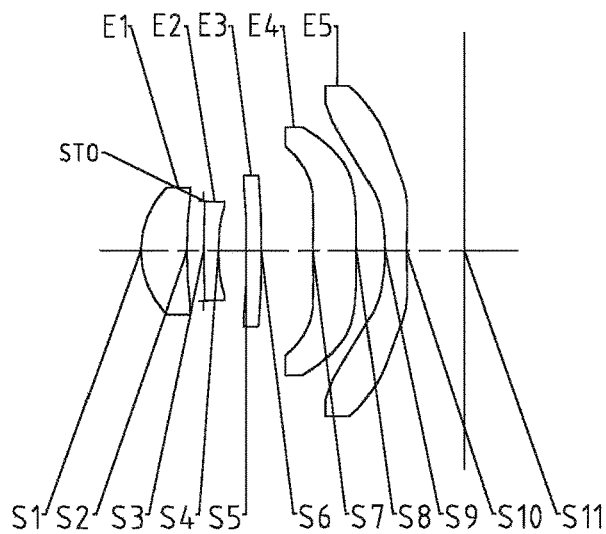
Fig. 6
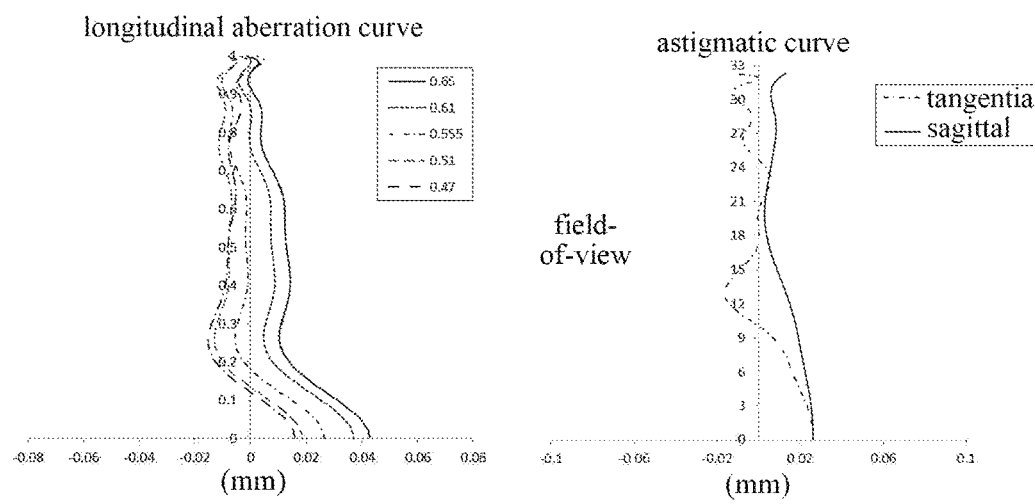
Fig. 7
Fig. 8
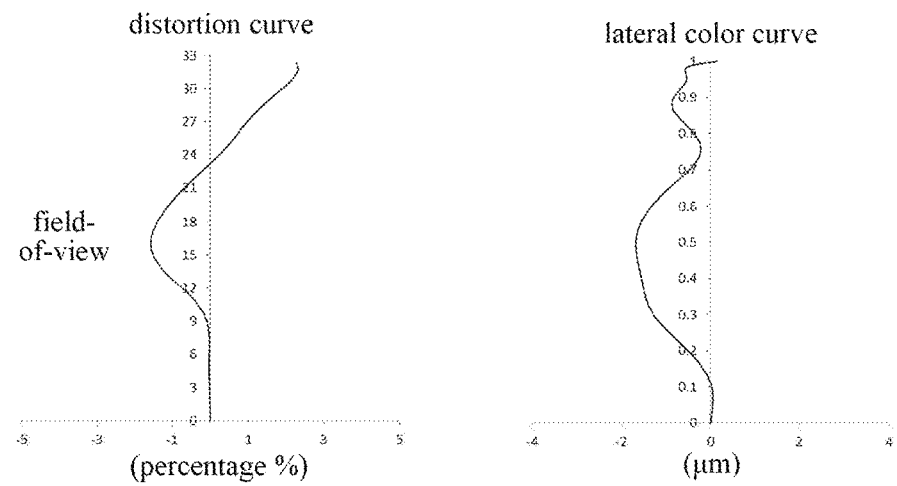
Fig. 9
Fig. 10

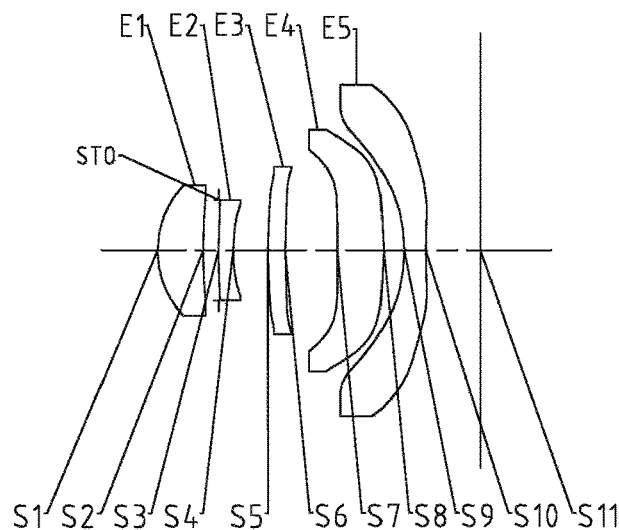
Fig. 21
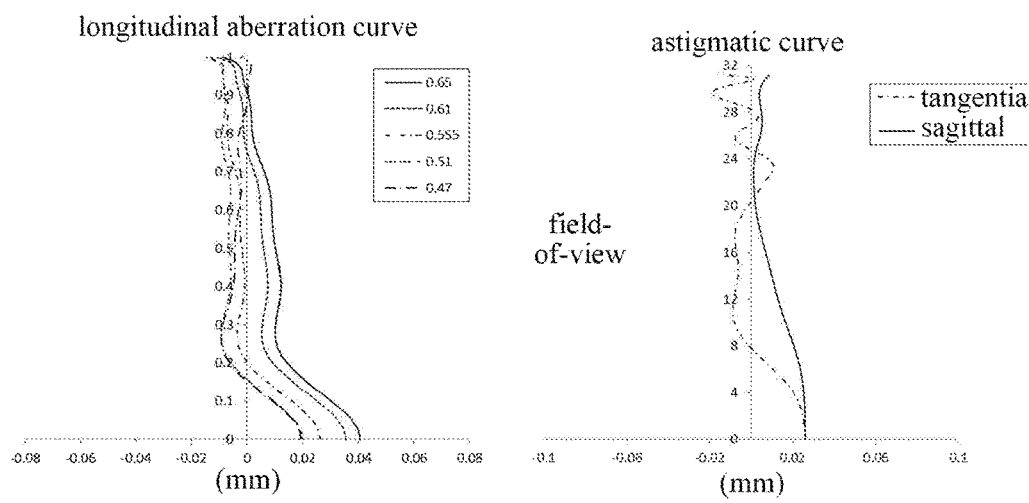
Fig. 22
Fig. 23
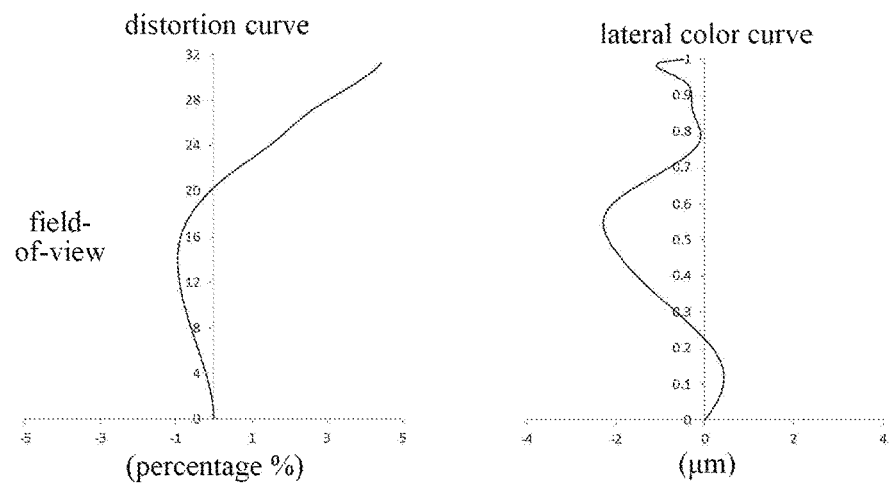
Fig. 24
Fig. 25

CAMERA LENS ASSEMBLY INCLUDING FIVE LENSES OF +−++− OR +−−+− REFRACTIVE POWERS

CROSS-REFERENCE TO RELATED APPLICATIONS

This application is a national stage of International Application No. PCT/CN2018/073168, filed on Jan. 18, 2018, which claims the priorities and rights of Chinese Patent Application No. 201710443540.0 and Chinese Patent Application No. 201720682644.2, filed with the State Intellectual Property Office of China (SIPO) on Jun. 13, 2017. All of the aforementioned applications are hereby incorporated by reference in their entireties.

TECHNICAL FIELD

The present disclosure relates to a camera lens assembly, and specifically to an ultrathin telephoto camera lens assembly comprising five lenses.

BACKGROUND

As the science and technology develop and the market demands, camera lens assemblies have been applied more widely. Meanwhile, as electronic products gradually tend to be lighter and thinner in development trend, camera lens assemblies of the electronic products not only need to have a good image quality, but also need to be light and thin in shape, so as to effectively reduce product costs and more in line with the humanized design. On the other hand, in order to meet one's use requirements, higher requirements on the image quality of objects captured by the camera lens assemblies of the electronic products have also been brought forward.

At present, the mainstream camera lens assembly adopts a wide-angle optical system in order to obtain images of a wide viewing angle. However, this is not conductive to shooting a distant object, and thus a clear image cannot be obtained. The currently emerging dual camera technology may obtain high spatial angle resolution through a telephoto lens assembly, and then achieve high-frequency information enhancement through an image fusion technology. However, the design of the telephoto lens assembly in the dual camera is a key technology. Above all, it is more difficult to simultaneously satisfy the telephoto design and the ultra thin design.

Therefore, in view of the above deficiencies in the existing technology, the present disclosure proposes an ultra-thin telephoto lens assembly having 5 lenses and high pixels. The camera lens assembly proposed by the present disclosure may obtain a good image quality and a good processing and manufacturing performance.

SUMMARY

The present disclosure provides a camera lens assembly, in order to solve at least some of the problems in the existing technology.

According to an aspect of the present disclosure, a camera lens assembly is provided. The camera lens assembly includes, sequentially from an object side to an image side of the camera lens assembly, a first lens, a second lens, a third lens, a fourth lens, and a fifth lens. The first lens has a positive refractive power. The second lens has a negative refractive power. The third lens has a positive refractive power or a negative refractive power. The fourth lens has a positive refractive power. The fifth lens has a negative refractive power. An effective focal length f of the camera lens assembly and a combined focal length f45 of the fourth lens and the fifth lens satisfy: $-1.0<f/f45\leq-0.5$.

According to another aspect of the present disclosure, a camera lens assembly is provided. The camera lens assembly includes, sequentially from an object side to an image side of the camera lens assembly, a first lens, a second lens, a third lens, a fourth lens, and a fifth lens. The first lens has a positive refractive power, and an object-side surface of the first lens is a convex surface. The second lens has a negative refractive power. The third lens has a positive refractive power or a negative refractive power. The fourth lens has a positive refractive power. The fifth lens has a negative refractive power, and an object-side surface of the fifth lens is a concave surface at a paraxial position. A center thickness CT3 of the third lens and an edge thickness ET3 of the third lens at a maximum radius satisfy: $0.8<CT3/ET3<1.2$.

According to an implementation of the present disclosure, the effective focal length f of the camera lens assembly and half of a maximal field-of-view HFOV of the camera lens assembly satisfy: $f*\tan(HFOV)\geq3.0$. An effective focal length f3 of the third lens and an effective focal length f4 of the fourth lens satisfy: $f4/|f3|\leq0.2$.

According to an implementation of the present disclosure, an axial distance TTL from the object-side surface of the first lens to an image plane and half of a diagonal length ImgH of an effective pixel area on the image plane satisfy: $TTL/ImgH\leq1.6$.

According to an implementation of the present disclosure, the effective focal length f of the camera lens assembly and a center thickness CT4 of the fourth lens satisfy: $7<f/CT4<9$.

According to an implementation of the present disclosure, the effective focal length f of the camera lens assembly and a radius of curvature R7 of an object-side surface of the fourth lens satisfy: $f/|R7|<0.5$.

According to an implementation of the present disclosure, the effective focal length f of the camera lens assembly and the effective focal length f3 of the third lens satisfy: $f/|f3|<0.2$.

According to an implementation of the present disclosure, an effective focal length f1 of the first lens and an effective focal length f5 of the fifth lens satisfy: $-1.2<f1/f5<-0.7$.

According to an implementation of the present disclosure, an axial distance BFL from an image-side surface of the fifth lens to the image plane satisfies: $0.75\leq BFL\leq0.95$.

According to an implementation of the present disclosure, an air spacing T34 between the third lens and the fourth lens on an optical axis satisfies: $0.6\leq T34\leq0.85$.

According to an implementation of the present disclosure, the effective focal length f of the camera lens assembly and the axial distance TTL from the object-side surface of the first lens to the image plane satisfy: $TTL/f<1.0$.

According to an implementation of the present disclosure, an object-side surface of the second lens is a convex surface, and an image-side surface of the second lens is a concave surface. An object-side surface of the third lens is a convex surface, and an image-side surface of the third lens is a concave surface.

The camera lens assembly according to the implementations of the present disclosure is an ultra-thin telephoto lens assembly structure having 5 lenses and high pixels, which may obtain a good image quality and a good processing and manufacturing performance.

BRIEF DESCRIPTION OF THE DRAWINGS

After reading detailed descriptions of non-limiting embodiments given with reference to the following accompanying drawings, other features, objectives and advantages of the present disclosure will become more apparent. In the accompanying drawings:

FIG. 6 is a schematic structural diagram illustrating a camera lens assembly according to Embodiment 2;

FIGS. 7-10 respectively illustrate a longitudinal aberration curve, an astigmatic curve, a distortion curve and a lateral color curve of the camera lens assembly according to Embodiment 2;

FIG. 21 is a schematic structural diagram illustrating a camera lens assembly according to Embodiment 5;

FIGS. 22-25 respectively illustrate a longitudinal aberration curve, an astigmatic curve, a distortion curve and a lateral color curve of the camera lens assembly according to Embodiment 5;

DETAILED DESCRIPTION OF EMBODIMENTS

Figure 1:
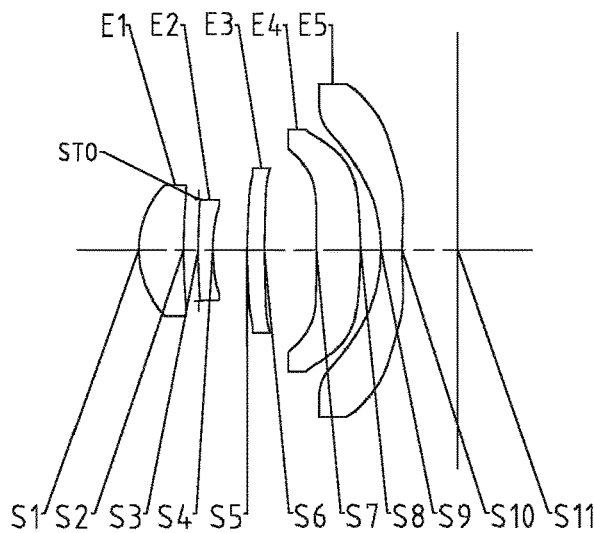
FIG. 1 is a schematic structural diagram illustrating a camera lens assembly according to Embodiment 1.

The present disclosure will be further described below in detail in combination with the accompanying drawings and the embodiments. It may be appreciated that the specific embodiments described herein are merely used for explaining the relevant invention, rather than limiting the invention. In addition, it should also be noted that, for the ease of description, only the parts related to the relevant invention are shown in the accompanying drawings.

It should be understood that in the present disclosure, when an element or a layer is referred to as being "on," "connected to" or "coupled to" another element or layer, it may be directly on, connected or coupled to another element or layer, or an intervening element or layer may be present. When an element is referred to as being "directly on," "directly connected to" or "directly coupled to" another element or layer, there are no intervening elements or layers present. The same reference numerals refer to the same elements throughout this specification. As used herein, the term "and/or" includes any and all combinations of one or more of the associated listed items.

It should be understood that, although terms such as "first" and "second" may be used herein to describe various elements, components, areas, layers and/or sections, these elements, components, areas, layers and/or sections should not be limited by these terms. These terms are used to distinguish one element, component, area, layer or section from another element, component, area, layer or section. Thus, a first element, component, area, layer or section discussed below may be termed a second element, component, area, layer or section without departing from the teachings of the present disclosure.

The terminology used herein is for the purpose of describing specific implementations only and is not intended to limit the present disclosure. As used herein, the singular forms "a," "an" and "the" are intended to include the plural forms as well, unless the context clearly indicates otherwise. It should be further understood that the terms "comprising," "including," "having" and variants thereof, when used in this specification, specify the presence of stated features, entireties, steps, operations, elements and/or components, but do not preclude the presence or addition of one or more other features, entireties, steps, operations, elements, components and/or groups thereof. As used herein, the term "and/or" includes any and all combinations of one or more of the associated listed items. Expressions, such as "at least one of," when preceding a list of elements, modify the entire list of elements rather than an individual element in the list. Further, the use of "may," when describing implementations of the present disclosure, relates to "one or more implementations of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

The present disclosure provides a camera lens assembly. The camera lens assembly according to the present disclosure includes a first lens, a second lens, a third lens, a fourth lens, and a fifth lens arranged in sequence from an object side to an image side of the camera lens assembly.

In embodiments of the present disclosure, the first lens has a positive refractive power, and an object-side surface of the first lens is a convex surface. In the embodiments of the present disclosure, the second lens has a negative refractive power. In the embodiments of the present disclosure, the third lens has a positive refractive power or a negative refractive power. In the embodiments of the present disclosure, the fourth lens has a positive refractive power. In the embodiments of the present disclosure, the fifth lens has a negative refractive power, and an object-side surface of the fifth lens is a concave surface at a paraxial position.

In the embodiments of the present disclosure, an effective focal length f of the camera lens assembly and a combined focal length f45 of the fourth lens and the fifth lens satisfy: $-1.0<f/f45\leq-0.5$, and more specifically, satisfy: $-0.84\leq f/f45\leq-0.51$. By satisfying the above condition, the size and the direction of the combined focal length of the fourth lens and the fifth lens can be controlled, and the camera lens assembly can achieve the balance of a spherical aberration of the system and obtain a good image quality of an on-axis field of view.

In the embodiments of the present disclosure, the effective focal length f of the camera lens assembly and half of a maximal field-of-view HFOV of the camera lens assembly satisfy: $f*\tan(HFOV)\geq 3.0$, and more specifically, satisfy: $f*\tan(HFOV)\geq 3.1$. An effective focal length f3 of the third lens and an effective focal length f4 of the fourth lens satisfy: $f4/|f3|\leq 0.2$, and more specifically, satisfy: $f4/|f3|\leq 0.001$. Through the reasonable distribution of the refractive powers satisfying the above conditions, the camera lens assembly realizes a low distribution of low-order aberrations of the system, obtains a good optical image quality, and achieves an ultra-thin function and a large image plane and high-pixel requirements for an imaging lens assembly.

In the embodiments of the present disclosure, an axial distance TTL from the object-side surface of the first lens to an image plane and half of a diagonal length ImgH of an effective pixel area on the image plane satisfy: $TTL/ImgH\leq 1.6$, and more specifically, satisfy: $TTL/ImgH\leq 1.54$. The ratio of the total track length of the lens assembly to the image height is restricted by the above condition, thereby achieving miniaturization of the lens assembly.

In the embodiments of the present disclosure, the effective focal length f of the camera lens assembly and a center thickness CT4 of the fourth lens satisfy: $7<f/CT4<9$, and more specifically, satisfy: $7.36\leq f/CT4\leq 8.46$. By satisfying the above condition, the center thickness of the fourth lens can be controlled, so that a distortion of the system may be controlled, which makes the entire system obtain a small level of distortion and a good image quality.

In the embodiments of the present disclosure, the effective focal length f of the camera lens assembly and a radius of curvature R7 of an object-side surface of the fourth lens satisfy: $f/|R7|<0.5$, and more specifically, satisfy: $f/|R7|\leq 0.42$. The radius of curvature of the object-side surface of the fourth lens is controlled by the above condition, which makes the camera system obtain a good level of field curvature, and further obtain a good image quality.

In the embodiments of the present disclosure, a center thickness CT3 of the third lens and an edge thickness ET3 of the third lens at a maximum radius satisfy: $0.8<CT3/ET3<1.2$, and more specifically, satisfy: $0.97\leq CT3/ET3\leq 1.02$. By the above condition, the center thickness of the third lens and the edge thickness of the third lens are controlled to ensure a good processing characteristic of the third lens, which makes the sensitive element easy to process, thereby obtaining a better sensitivity characteristic of the system.

In the embodiments of the present disclosure, the effective focal length f of the camera lens assembly and the effective focal length f3 of the third lens satisfy: $f/|f3|<0.2$, and more specifically, satisfy: $f/|f3|\leq 0.11$. The refractive power of the third lens as one of the main undertakers of the refractive power of the system is controlled by the above condition, to control the spherical aberration and a comatic aberration of the system to be balanced at a low level, so as to obtain a good image quality and sensitivity.

In the embodiments of the present disclosure, an effective focal length f1 of the first lens and an effective focal length f5 of the fifth lens satisfy: $-1.2<f1/f5<-0.7$, and more specifically, satisfy: $-1.06\leq f1/f5\leq-0.75$. By controlling the proportional range of the effective focal length f1 of the first lens and the effective focal length f5 of the fifth lens by the above condition, the refractive power of the system can be reasonably distributed, thereby obtaining a good primary aberration level and a good image quality.

In the embodiments of the present disclosure, an axial distance BFL from an image-side surface of the fifth lens to the image plane satisfies: $0.75\leq BFL\leq 0.95$, and more specifically, satisfy: $0.82\leq BFL\leq 0.95$. The camera lens assembly satisfying the above condition can limit the back focus within a certain reasonable range by optimizing the constraint, and the requirement of the back-end optical module to adjust the focal length for different distances from the object side is ensured.

In the embodiments of the present disclosure, an air spacing T34 between the third lens and the fourth lens on an optical axis satisfies: $0.6\leq T34\leq 0.85$, and more specifically, satisfy: $0.62\leq T34\leq 0.82$. By satisfying the above condition, the spacing distance between the third lens and the fourth lens is controlled, which makes the optical system obtain a good balance level of the field curvature.

In the embodiments of the present disclosure, the effective focal length f of the camera lens assembly and the axial distance TTL from the object-side surface of the first lens to the image plane satisfy: $TTL/f<1.0$, and more specifically, satisfy: $TTL/f\leq 0.95$. The camera lens assembly satisfying the above condition can maintain the miniaturization of the telephoto lens assembly, and achieve a small field-of-view and a high magnifying power.

The present disclosure is further described below in combination with specific embodiments.

Embodiment 1

First, a camera lens assembly according to Embodiment 1 of the present disclosure is described with reference to FIGS. 1-5.

FIG. 1 is a schematic structural diagram illustrating the camera lens assembly according to Embodiment 1. As shown in FIG. 1, the camera lens assembly includes five lenses. The five lenses are respectively a first lens E1 having an object-side surface S1 and an image-side surface S2, a second lens E2 having an object-side surface S3 and an image-side surface S4, a third lens E3 having an object-side surface S5 and an image-side surface S6, a fourth lens E4 having an object-side surface S7 and an image-side surface S8, and a fifth lens E5 having an object-side surface S9 and an image-side surface S10. The first to fifth lenses E1-E5 are arranged in sequence from an object side to an image side of the camera lens assembly. The first lens E1 may have a positive refractive power, and the object-side surface S1 of the first lens may be a convex surface. The second lens E2 may have a negative refractive power, and the image-side surface S4 of the second lens may be a concave surface. The third lens E3 may have a positive refractive power or a negative refractive power. The fourth lens E4 may have a positive refractive power. The fifth lens E5 may have a negative refractive power, and an object-side surface of the fifth lens is a concave surface at a paraxial position. In this embodiment, light from an object sequentially passes through the surfaces S1-S10 and finally forms an image on an image plane S11.

In this embodiment, the first to fifth lenses E1-E5 have their respective effective focal lengths f1-f5. The first to fifth lenses E1-E5 are sequentially arranged along an optical axis and collectively determine a total effective focal length f of the camera lens assembly. Table 1 below shows the effective focal lengths f1-f5 of the first to fifth lenses E1-E5, the total effective focal length f of the camera lens assembly, the total track length TTL of the camera lens assembly, and the half of the diagonal length ImgH of the effective pixel area on the image plane.

TABLE 1

| f1(mm) | 2.93 | f(mm) | 5.06 |
|---|---|---|---|
| f2(mm) | −4.96 | TTL(mm) | 4.82 |
| f3(mm) | 46.95 | ImgH(mm) | 3.21 |
| f4(mm) | 5.90 | | |
| f5(mm) | −2.82 | | |

Table 2 shows the surface type, the radius of curvature, the thickness, the refractive index, the abbe number, and the conic coefficient of each lens of the camera lens assembly in this embodiment.

TABLE 2

| surface number | surface type | radius of curvature | thickness | refractive index, abbe number | conic coefficient |
|---|---|---|---|---|---|
| OBJ | spherical | infinite | infinite | | |
| S1 | aspheric | 1.4170 | 0.6796 | 1.55, 56.1 | 0.3631 |
| S2 | aspheric | 10.1912 | 0.2277 | | −61.7744 |
| STO | spherical | infinite | −0.0063 | | |
| S3 | aspheric | 11.2259 | 0.2200 | 1.67, 20.4 | 38.3217 |
| S4 | aspheric | 2.5320 | 0.5200 | | 1.7989 |
| S5 | aspheric | 5.5737 | 0.2604 | 1.55, 56.1 | −94.8373 |
| S6 | aspheric | 7.0047 | 0.7884 | | −95.0000 |
| S7 | aspheric | 63.9246 | 0.6623 | 1.67, 20.4 | 95.0000 |
| S8 | aspheric | −4.1710 | 0.3063 | | 2.6905 |
| S9 | aspheric | −2.3855 | 0.3200 | 1.54, 55.9 | −0.2757 |
| S10 | aspheric | 4.3345 | 0.8416 | | −77.6609 |
| S11 | spherical | infinite | | | |

Table 3 below shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S10 of the aspheric lenses in this embodiment.

TABLE 3

| surface number | A4 | A6 | A8 | A10 | A12 |
|---|---|---|---|---|---|
| S1 | −1.2049E−02 | −4.3932E−02 | 1.5486E−01 | −3.8471E−01 | 4.6916E−01 |
| S2 | −1.3055E−02 | 1.3772E−01 | −8.1604E−01 | 3.5092E+00 | −9.2039E+00 |
| S3 | −4.5556E−02 | −3.7833E−02 | 1.7997E+00 | −1.0650E+01 | 3.6813E+01 |
| S4 | −4.6265E−02 | 7.3611E−01 | −6.7821E+00 | 4.9628E+01 | −2.2905E+02 |
| S5 | −9.8851E−03 | −2.9062E−01 | 1.1604E+00 | −2.4840E+00 | 3.5523E+00 |
| S6 | −4.5396E−02 | −9.7383E−02 | 3.1497E−01 | −3.4877E−01 | 2.0936E−01 |
| S7 | 2.3242E−02 | −7.8816E−02 | −1.6657E−01 | 5.4192E−01 | −7.5734E−01 |
| S8 | 2.2785E−01 | −3.7712E−01 | 3.5795E−01 | −2.6932E−01 | 1.6039E−01 |
| S9 | 1.0816E−01 | −3.0772E−01 | 2.6512E−01 | −7.2276E−02 | −2.1000E−02 |
| S10 | −1.0010E−01 | −9.5447E−03 | 1.2327E−02 | 1.7017E−02 | −1.5621E−02 |

| surface number | A14 | A16 | A18 | A20 |
|---|---|---|---|---|
| S1 | −1.5099E−01 | −2.9073E−01 | 3.3384E−01 | −1.0731E−01 |
| S2 | 1.4343E+01 | −1.2369E+01 | 4.8495E+00 | −3.6789E−01 |
| S3 | −8.0229E+01 | 1.0719E+02 | −7.9766E+01 | 2.5177E+01 |
| S4 | 6.6496E+02 | −1.1797E+03 | 1.1686E+03 | −4.9516E+02 |
| S5 | −3.2596E+00 | 1.8671E+00 | −6.0632E−01 | 8.5630E−02 |
| S6 | −2.2119E−02 | −4.9058E−02 | 2.4499E−02 | −3.3001E−03 |
| S7 | 5.9123E−01 | −2.6334E−01 | 6.2629E−02 | −6.1812E−03 |
| S8 | −7.2430E−02 | 2.2275E−02 | −4.0020E−03 | 3.1148E−04 |
| S9 | 1.8826E−02 | −4.9703E−03 | 5.9858E−04 | −2.8054E−05 |
| S10 | 5.3740E−03 | −9.5085E−04 | 8.6722E−05 | −3.2439E−06 |

Figures 2, 3:
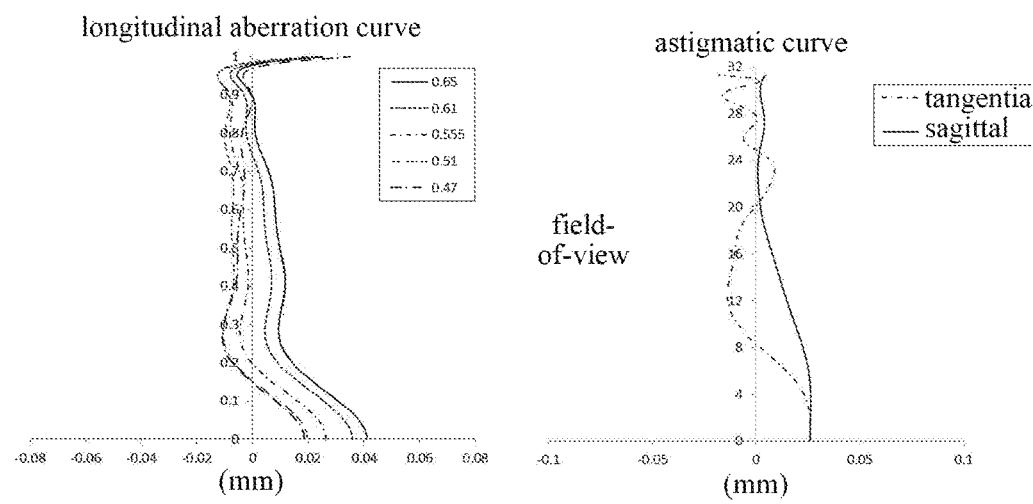
FIGS. 2-5 respectively illustrate a longitudinal aberration curve, an astigmatic curve, a distortion curve and a lateral color curve of the camera lens assembly according to Embodiment 1.
Figures 4, 5:
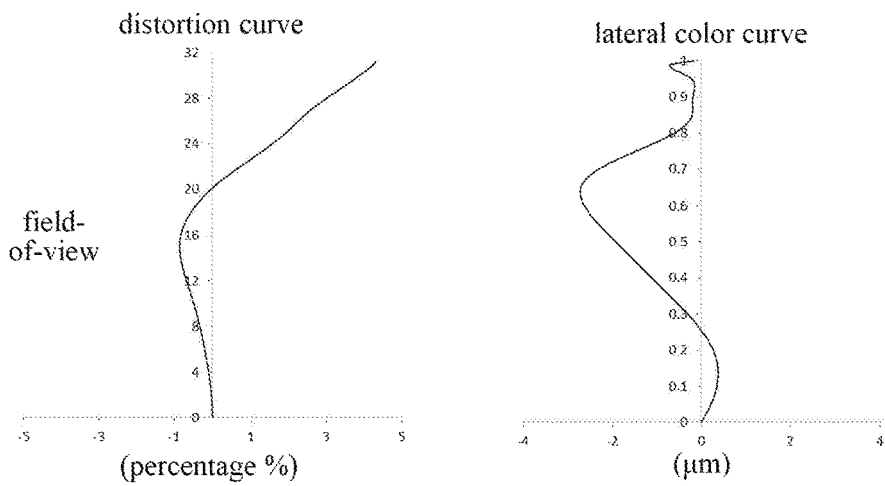

FIG. 2 shows a longitudinal aberration curve of the camera lens assembly according to Embodiment 1, representing deviations of focal points of light of different wavelengths converged after passing through an optical system. FIG. 3 shows an astigmatic curve of the camera lens assembly according to Embodiment 1, representing a curvature of a tangential image plane and a curvature of a sagittal image plane. FIG. 4 shows a distortion curve of the camera lens assembly according to Embodiment 1, representing amounts of distortion at different viewing angles. FIG. 5 shows a lateral color curve of the camera lens assembly according to Embodiment 1, representing deviations of different image heights on an image plane after light passes through the camera lens assembly. In summary, referring to FIGS. 2-5, it may be seen that the camera lens assembly according to Embodiment 1 has an ultra-thin telephoto lens assembly structure, which may obtain a good image quality and a good processing and manufacturing performance.

Embodiment 2

A camera lens assembly according to Embodiment 2 of the present disclosure is described below with reference to FIGS. 6-10. In addition to the parameters of each lens of the camera lens assembly, for example, in addition to the radii of curvature, the thicknesses, the refractive indices, the abbe numbers, the conic coefficients, the effective focal lengths, the axial spacing distances and the high-order coefficients of the lenses, the camera lens assemblies described in Embodiment 2 and the following embodiments are the same in arrangement and structure as the camera lens assembly described in Embodiment 1. In this embodiment and the following embodiments, for the purpose of brevity, the description of parts similar to those in Embodiment 1 will be omitted.

FIG. 6 is a schematic structural diagram illustrating the camera lens assembly according to Embodiment 2. The camera lens assembly from an object side to an image side sequentially includes a first lens E1, a second lens E2, a third lens E3, a fourth lens E4, and a fifth lens E5.

Table 4 below shows the effective focal lengths f1-f5 of the first to fifth lenses E1-E5, the total effective focal length f of the camera lens assembly, the total track length TTL of the camera lens assembly, and the half of the diagonal length ImgH of the effective pixel area on the image plane.

TABLE 4

| f1(mm) | 2.93 | f(mm) | 5.06 |
|---|---|---|---|
| f2(mm) | −5.02 | TTL(mm) | 4.82 |
| f3(mm) | −2209.44 | ImgH(mm) | 3.24 |
| f4(mm) | 8.18 | | |
| f5(mm) | −3.91 | | |

Table 5 shows the surface type, the radius of curvature, the thickness, the refractive index, the abbe number, and the conic coefficient of each lens of the camera lens assembly in this embodiment.

TABLE 5

| surface number | surface type | radius of curvature | thickness | refractive index, abbe number | conic coefficient |
|---|---|---|---|---|---|
| OBJ | spherical | infinite | infinite | | |
| S1 | aspheric | 1.3666 | 0.6889 | 1.55, 56.1 | 0.3368 |
| S2 | aspheric | 7.7719 | 0.2433 | | −22.9034 |
| STO | spherical | infinite | 0.0047 | | |
| S3 | aspheric | 28.7599 | 0.2200 | 1.67, 20.4 | −95.0000 |
| S4 | aspheric | 2.9861 | 0.4150 | | 0.1281 |
| S5 | aspheric | 14.1700 | 0.2253 | 1.55, 56.1 | −20.4718 |
| S6 | aspheric | 13.9268 | 0.7707 | | −18.8968 |
| S7 | aspheric | 12.1904 | 0.6508 | 1.67, 20.4 | 51.3171 |
| S8 | aspheric | −9.6354 | 0.4204 | | 3.5430 |
| S9 | aspheric | −2.6042 | 0.3200 | 1.54, 55.9 | −0.2024 |
| S10 | aspheric | 11.1962 | 0.8608 | | −5.8453 |
| S11 | spherical | infinite | | | |

Table 6 below shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S10 of the aspheric lenses in this embodiment.

FIG. 7 shows a longitudinal aberration curve of the camera lens assembly according to Embodiment 2, representing deviations of focal points of light of different wavelengths converged after passing through an optical system. FIG. 8 shows an astigmatic curve of the camera lens assembly according to Embodiment 2, representing a curvature of a tangential image plane and a curvature of a sagittal image plane. FIG. 9 shows a distortion curve of the camera lens assembly according to Embodiment 2, representing amounts of distortion at different viewing angles. FIG. 10 shows a lateral color curve of the camera lens assembly according to Embodiment 2, representing deviations of different image heights on an image plane after light passes through the camera lens assembly. In summary, referring to FIGS. 7-10, it may be seen that the camera lens assembly according to Embodiment 2 has an ultra-thin telephoto lens assembly structure, which may obtain a good image quality and a good processing and manufacturing performance.

Embodiment 3

A camera lens assembly according to Embodiment 3 of the present disclosure is described below with reference to FIGS. 11-15.

Figure 11:
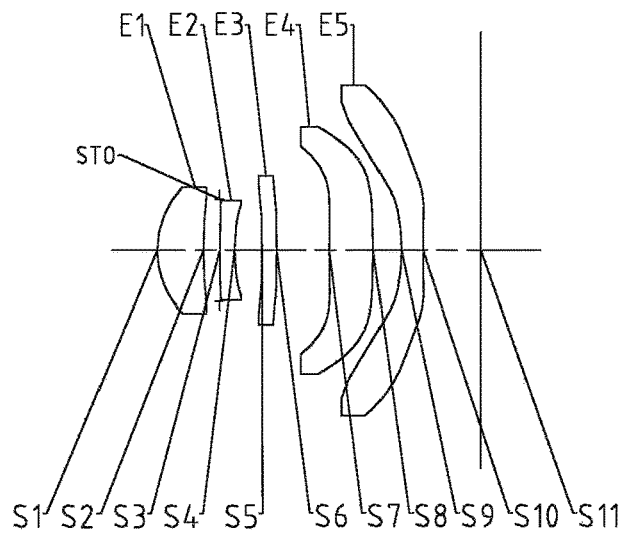
FIG. 11 is a schematic structural diagram illustrating a camera lens assembly according to Embodiment 3.

FIG. 11 is a schematic structural diagram illustrating the camera lens assembly according to Embodiment 3. The camera lens assembly from an object side to an image side sequentially includes a first lens E1, a second lens E2, a third lens E3, a fourth lens E4, and a fifth lens E5.

Table 7 below shows the effective focal lengths f1-f5 of the first to fifth lenses E1-E5, the total effective focal length f of the camera lens assembly, the total track length TTL of the camera lens assembly, and the half of the diagonal length ImgH of the effective pixel area on the image plane.

TABLE 7

| f1(mm) | 2.91 | f(mm) | 5.06 |
|---|---|---|---|
| f2(mm) | −4.98 | TTL(mm) | 4.82 |

TABLE 6

| surface number | A4 | A6 | A8 | A10 | A12 |
|---|---|---|---|---|---|
| S1 | −1.3801E−02 | −2.1131E−02 | −8.0836E−03 | 3.0206E−01 | −1.3147E+00 |
| S2 | −1.3085E−02 | 1.8363E−01 | −1.4220E+00 | 7.5544E+00 | −2.4793E+01 |
| S3 | −1.7619E−02 | −1.9387E−01 | 3.9205E+00 | −2.6370E+01 | 1.0628E+02 |
| S4 | −2.8757E−02 | 1.0633E+00 | −1.1246E+01 | 8.9358E+01 | −4.4546E+02 |
| S5 | −1.7449E−01 | −1.3991E−01 | 1.3456E+00 | −4.1793E+00 | 8.6902E+00 |
| S6 | −1.6758E−01 | 3.2409E−02 | 2.1393E−01 | −3.9640E−01 | 6.6858E−01 |
| S7 | −7.8506E−03 | −9.2146E−02 | −5.7568E−02 | 2.8785E−01 | −4.0433E−01 |
| S8 | 1.7094E−01 | −4.3328E−01 | 5.1262E−01 | −4.3779E−01 | 2.6911E−01 |
| S9 | 3.0819E−01 | −9.8215E−01 | 1.1289E+00 | −6.9044E−01 | 2.5381E−01 |
| S10 | 5.8854E−02 | −4.2189E−01 | 4.2793E−01 | −2.1599E−01 | 6.4870E−02 |

| surface number | A14 | A16 | A18 | A20 |
|---|---|---|---|---|
| S1 | 2.736235678 | −3.1295E+00 | 1.8843E+00 | −4.6788E−01 |
| S2 | 50.43902277 | −6.1740E+01 | 4.1546E+01 | −1.1776E+01 |
| S3 | −269.497008 | 4.1919E+02 | −3.6540E+02 | 1.3670E+02 |
| S4 | 1390.58177 | −2.6388E+03 | 2.7811E+03 | −1.2477E+03 |
| S5 | −11.91654018 | 1.0266E+01 | −5.0531E+00 | 1.0882E+00 |
| S6 | −0.860273541 | 6.9044E−01 | −3.1467E−01 | 6.2505E−02 |
| S7 | 0.297580126 | −1.2078E−01 | 2.5465E−02 | −2.1735E−03 |
| S8 | −0.114737218 | 3.1666E−02 | −5.0147E−03 | 3.4264E−04 |
| S9 | −0.058132381 | 8.1635E−03 | −6.4603E−04 | 2.2136E−05 |
| S10 | −0.012198994 | 1.4164E−03 | −9.3026E−05 | 2.6406E−06 |

TABLE 7-continued

| | | | |
|---|---|---|---|
| f3(mm) | 5924.80 | ImgH(mm) | 3.24 |
| f4(mm) | 8.20 | | |
| f5(mm) | −3.87 | | |

Table 8 shows the surface type, the radius of curvature, the thickness, the refractive index, the abbe number, and the conic coefficient of each lens of the camera lens assembly in this embodiment.

TABLE 8

| surface number | surface type | radius of curvature | thickness | refractive index, abbe number | conic coefficient |
|---|---|---|---|---|---|
| OBJ | spherical | infinite | infinite | | |
| S1 | aspheric | 1.3683 | 0.6897 | 1.55, 56.1 | 0.3375 |
| S2 | aspheric | 8.1162 | 0.2388 | | −23.2632 |
| STO | spherical | infinite | 0.0050 | | |
| S3 | aspheric | 34.5279 | 0.2200 | 1.67, 20.4 | −95.0000 |
| S4 | aspheric | 3.0172 | 0.4076 | | −0.1176 |
| S5 | aspheric | 18.2654 | 0.2200 | 1.55, 56.1 | −66.5280 |
| S6 | aspheric | 18.2910 | 0.7848 | | −37.9486 |
| S7 | aspheric | 12.4970 | 0.6524 | 1.67, 20.4 | 55.8938 |
| S8 | aspheric | −9.4884 | 0.4207 | | 5.7725 |
| S9 | aspheric | −2.6070 | 0.3200 | 1.54, 55.9 | −0.1996 |
| S10 | aspheric | 10.6938 | 0.8611 | | −10.6939 |
| S11 | spherical | infinite | | | |

Table 9 below shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S10 of the aspheric lenses in this embodiment.

TABLE 9

| surface number | A4 | A6 | A8 | A10 | A12 |
|---|---|---|---|---|---|
| S1 | −1.5314E−02 | −5.7572E−03 | −9.8960E−02 | 6.2379E−01 | −2.0139E+00 |
| S2 | −1.4340E−02 | 1.7818E−01 | −1.2312E+00 | 5.8997E+00 | −1.7372E+01 |
| S3 | −1.5584E−02 | −1.8745E−01 | 3.7079E+00 | −2.3755E+01 | 9.0916E+01 |
| S4 | −2.8129E−02 | 1.0437E+00 | −1.0677E+01 | 8.2882E+01 | −4.0385E+02 |
| S5 | −1.9182E−01 | −7.0279E−02 | 1.0060E+00 | −3.0110E+00 | 6.1451E+00 |
| S6 | −1.8511E−01 | 1.0365E−01 | −6.2049E−02 | 3.5503E−01 | −6.3808E−01 |
| S7 | −1.2444E−02 | −8.1561E−02 | −8.5431E−02 | 3.3610E−01 | −4.5425E−01 |
| S8 | 1.6934E−01 | −4.3270E−01 | 5.1794E−01 | −4.5014E−01 | 2.8292E−01 |
| S9 | 3.0356E−01 | −9.6280E−01 | 1.0994E+00 | −6.6704E−01 | 2.4309E−01 |
| S10 | 6.0997E−02 | −4.2124E−01 | 4.2446E−01 | −2.1383E−01 | 6.4350E−02 |

| surface number | A14 | A16 | A18 | A20 |
|---|---|---|---|---|
| S1 | 3.6645E+00 | −3.8503E+00 | 2.1767E+00 | −5.1301E−01 |
| S2 | 3.1339E+01 | −3.3318E+01 | 1.8806E+01 | −4.2025E+00 |
| S3 | −2.1897E+02 | 3.2372E+02 | −2.6846E+02 | 9.5676E+01 |
| S4 | 1.2327E+03 | −2.2885E+03 | 2.3612E+03 | −1.0377E+03 |
| S5 | −8.3038E+00 | 7.0357E+00 | −3.4232E+00 | 7.3969E−01 |
| S6 | 6.1038E−01 | −3.4438E−01 | 9.3411E−02 | −5.4322E−03 |
| S7 | 3.2752E−01 | −1.3068E−01 | 2.7032E−02 | −2.2510E−03 |
| S8 | −1.2338E−01 | 3.4718E−02 | −5.5828E−03 | 3.8591E−04 |
| S9 | −5.5201E−02 | 7.6901E−03 | −6.0438E−04 | 2.0595E−05 |
| S10 | −1.2171E−02 | 1.4260E−03 | −9.4739E−05 | 2.7252E−06 |

Figure 12:
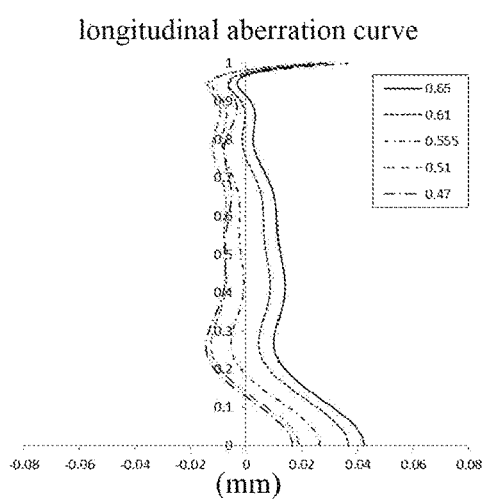
FIGS. 12-15 respectively illustrate a longitudinal aberration curve, an astigmatic curve, a distortion curve and a lateral color curve of the camera lens assembly according to Embodiment 3.
Figure 13:
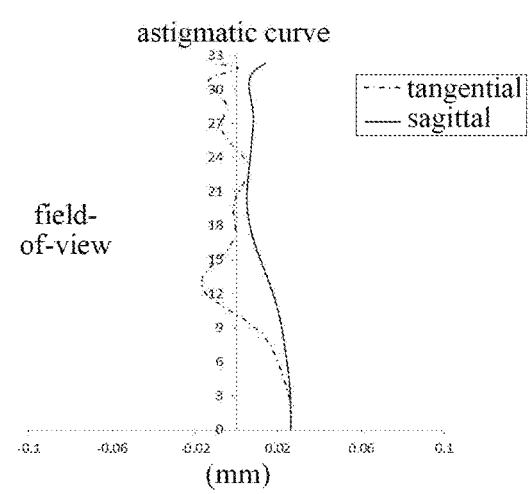
Figure 14:
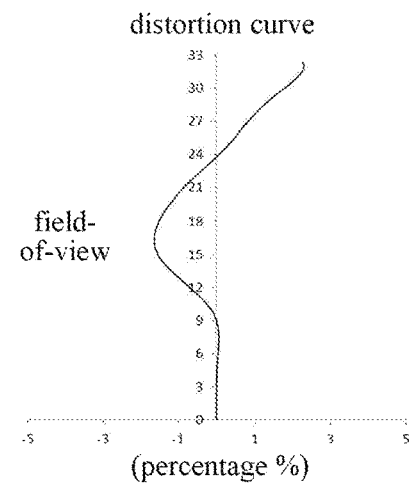
Figure 15:
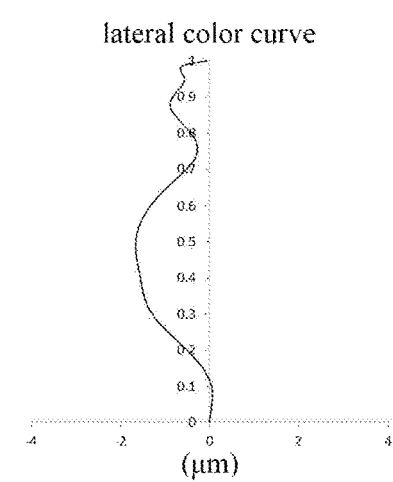

FIG. 12 shows a longitudinal aberration curve of the camera lens assembly according to Embodiment 3, representing deviations of focal points of light of different wavelengths converged after passing through an optical system. FIG. 13 shows an astigmatic curve of the camera lens assembly according to Embodiment 3, representing a curvature of a tangential image plane and a curvature of a sagittal image plane. FIG. 14 shows a distortion curve of the camera lens assembly according to Embodiment 3, representing amounts of distortion at different viewing angles. FIG. 15 shows a lateral color curve of the camera lens assembly according to Embodiment 3, representing deviations of different image heights on an image plane after light passes through the camera lens assembly. In summary, referring to FIGS. 12-15, it may be seen that the camera lens assembly according to Embodiment 3 has an ultra-thin telephoto lens assembly structure, which may obtain a good image quality and a good processing and manufacturing performance.

Embodiment 4

A camera lens assembly according to Embodiment 4 of the present disclosure is described below with reference to FIGS. 16-20.

Figure 16:
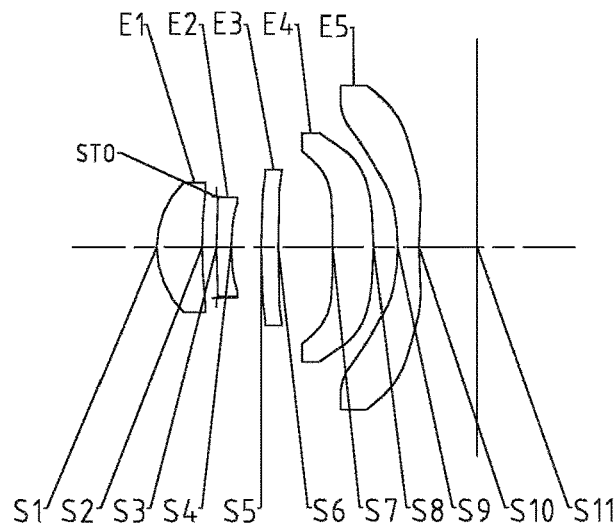
FIG. 16 is a schematic structural diagram illustrating a camera lens assembly according to Embodiment 4.

FIG. 16 is a schematic structural diagram illustrating the camera lens assembly according to Embodiment 4. The camera lens assembly from an object side to an image side sequentially includes a first lens E1, a second lens E2, a third lens E3, a fourth lens E4, and a fifth lens E5.

Table 10 below shows the effective focal lengths f1-f5 of the first to fifth lenses E1-E5, the total effective focal length f of the camera lens assembly, the total track length TTL of the camera lens assembly, and the half of the diagonal length ImgH of the effective pixel area on the image plane.

TABLE 10

| | | | |
|---|---|---|---|
| f1(mm) | 2.99 | f(mm) | 5.06 |
| f2(mm) | −5.18 | TTL(mm) | 4.82 |

TABLE 10-continued

| | | | |
|---|---|---|---|
| f3(mm) | 47.71 | ImgH(mm) | 3.12 |
| f4(mm) | 6.22 | | |
| f5(mm) | −3.07 | | |

Table 11 below shows the surface type, the radius of curvature, the thickness, the refractive index, the abbe number, and the conic coefficient of each lens of the camera lens assembly in this embodiment.

TABLE 11

| surface number | surface type | radius of curvature | thickness | refractive index, abbe number | conic coefficient |
|---|---|---|---|---|---|
| OBJ | spherical | infinite | infinite | | |
| S1 | aspheric | 1.3797 | 0.6836 | 1.55, 56.1 | 0.3161 |
| S2 | aspheric | 7.3618 | 0.2175 | | −43.6179 |
| STO | spherical | infinite | −0.0002 | | |
| S3 | aspheric | 15.7928 | 0.2200 | 1.67, 20.4 | 48.5181 |
| S4 | aspheric | 2.8125 | 0.4524 | | 2.1993 |
| S5 | aspheric | 5.6877 | 0.2589 | 1.55, 56.1 | −95.0000 |
| S6 | aspheric | 7.1598 | 0.8182 | | −95.0000 |
| S7 | aspheric | −36.3388 | 0.6176 | 1.67, 20.4 | 95.0000 |
| S8 | aspheric | −3.7403 | 0.3556 | | −0.4649 |
| S9 | aspheric | −2.5319 | 0.3200 | 1.54, 55.9 | −0.2662 |
| S10 | aspheric | 4.9214 | 0.8764 | | −17.8363 |
| Si 1 | spherical | infinite | | | |

Table 12 below shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S10 of the aspheric lenses in this embodiment.

TABLE 12

| surface number | A4 | A6 | A8 | A10 | A12 |
|---|---|---|---|---|---|
| S1 | −1.0274E−02 | −5.5003E−02 | 2.5433E−01 | −8.3691E−01 | 1.6655E+00 |
| S2 | −1.0220E−02 | 5.2598E−02 | −9.6570E−02 | 2.1334E−01 | −3.2707E−01 |
| S3 | −5.7397E−02 | 5.3456E−02 | 1.3305E+00 | −8.1109E+00 | 2.7483E+01 |
| S4 | −5.3238E−02 | 8.2775E−01 | −7.1641E+00 | 5.2315E+01 | −2.4260E+02 |
| S5 | −5.2875E−02 | −2.2319E−01 | 1.1963E+00 | −3.1355E+00 | 5.4457E+00 |
| S6 | −7.4483E−02 | −3.9921E−02 | 2.0008E−01 | −1.3321E−01 | −1.5847E−01 |
| S7 | 6.0783E−02 | −3.4360E−01 | 5.9653E−01 | −7.8035E−01 | 6.6148E−01 |
| S8 | 2.6708E−01 | −6.3522E−01 | 8.1426E−01 | −7.4587E−01 | 4.7727E−01 |
| S9 | 2.6944E−01 | −7.2774E−01 | 7.1273E−01 | −3.4279E−01 | 8.4110E−02 |
| S10 | −4.4454E−02 | −1.4608E−01 | 1.4727E−01 | −5.9410E−02 | 1.1019E−02 |

| surface number | A14 | A16 | A18 | A20 |
|---|---|---|---|---|
| S1 | −2.0523E+00 | 1.4954E+00 | −5.7836E−01 | 8.7075E−02 |
| S2 | 3.3449E−01 | −2.2076E−01 | 7.8313E−02 | −1.0914E−02 |
| S3 | −5.8691E+01 | 7.7350E+01 | −5.7505E+01 | 1.8460E+01 |
| S4 | 7.0991E+02 | −1.2727E+03 | 1.2770E+03 | −5.4913E+02 |
| S5 | −5.9970E+00 | 4.0099E+00 | −1.4986E+00 | 2.4191E−01 |
| S6 | 4.8165E−01 | −4.7453E−01 | 2.0877E−01 | −3.4579E−02 |
| S7 | −3.4698E−01 | 1.0207E−01 | −1.2909E−02 | 9.1416E−05 |
| S8 | −2.0411E−01 | 5.4730E−02 | −8.3178E−03 | 5.5398E−04 |
| S9 | −8.1810E−03 | −5.5245E−04 | 1.8475E−04 | −1.1245E−05 |
| S10 | −3.9090E−04 | −2.0044E−04 | 3.3181E−05 | −1.6430E−06 |

Figure 17:
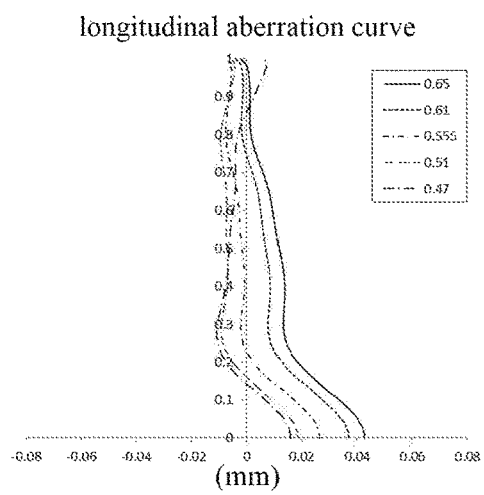
FIGS. 17-20 respectively illustrate a longitudinal aberration curve, an astigmatic curve, a distortion curve and a lateral color curve of the camera lens assembly according to Embodiment 4.
Figure 18:
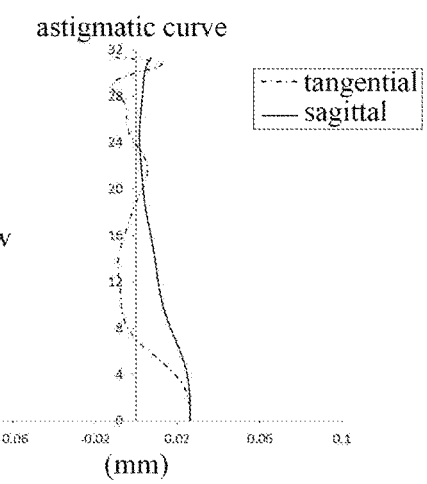
Figure 19:
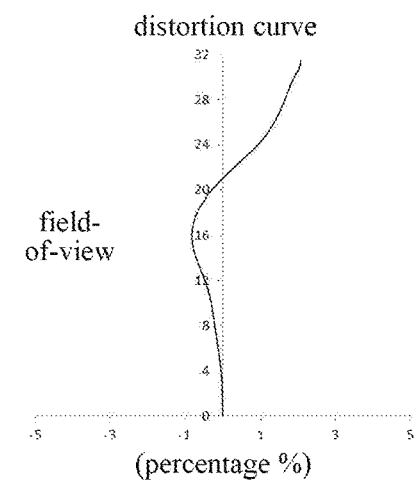
Figure 20:
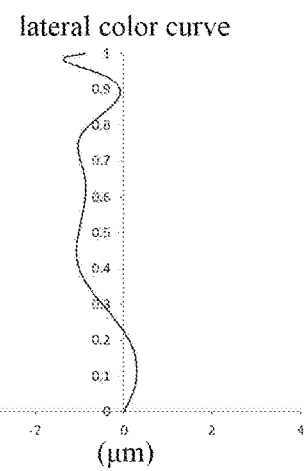

FIG. 17 shows a longitudinal aberration curve of the camera lens assembly according to Embodiment 4, representing deviations of focal points of light of different wavelengths converged after passing through an optical system. FIG. 18 shows an astigmatic curve of the camera lens assembly according to Embodiment 4, representing a curvature of a tangential image plane and a curvature of a sagittal image plane. FIG. 19 shows a distortion curve of the camera lens assembly according to Embodiment 4, representing amounts of distortion at different viewing angles. FIG. 20 shows a lateral color curve of the camera lens assembly according to Embodiment 4, representing deviations of different image heights on an image plane after light passes through the camera lens assembly. In summary, referring to FIGS. 17-20, it may be seen that the camera lens assembly according to Embodiment 4 has an ultra-thin telephoto lens assembly structure, which may obtain a good image quality and a good processing and manufacturing performance.

Embodiment 5

A camera lens assembly according to Embodiment 5 of the present disclosure is described below with reference to FIGS. 21-25.

FIG. 21 is a schematic structural diagram illustrating the camera lens assembly according to Embodiment 5. The camera lens assembly from an object side to an image side sequentially includes a first lens E1, a second lens E2, a third lens E3, a fourth lens E4, and a fifth lens E5.

Table 13 below shows the effective focal lengths f1-f5 of the first to fifth lenses E1-E5, the total effective focal length f of the camera lens assembly, the total track length TTL of the camera lens assembly, and the half of the diagonal length ImgH of the effective pixel area on the image plane.

TABLE 13

| f1(mm) | 2.91 | f(mm) | 5.06 |
|---|---|---|---|
| f2(mm) | −4.89 | TTL(mm) | 4.82 |

TABLE 13-continued

| f3(mm) | 52.04 | ImgH(mm) | 3.23 |
|---|---|---|---|
| f4(mm) | 5.83 | | |
| f5(mm) | −2.76 | | |

Table 14 below shows the surface type, the radius of curvature, the thickness, the refractive index, the abbe number, and the conic coefficient of each lens of the camera lens assembly in this embodiment.

TABLE 14

| surface number | surface type | radius of curvature | thickness | refractive index, abbe number | conic coefficient |
|---|---|---|---|---|---|
| OBJ | spherical | infinite | infinite | | |
| S1 | aspheric | 1.4204 | 0.6842 | 1.55, 56.1 | 0.3659 |
| S2 | aspheric | 10.9898 | 0.2304 | | −58.5946 |
| STO | spherical | infinite | −0.0035 | | |
| S3 | aspheric | 12.5271 | 0.2200 | 1.67, 20.4 | 52.8313 |
| S4 | aspheric | 2.5665 | 0.5191 | | 1.7663 |
| S5 | aspheric | 5.2010 | 0.2589 | 1.55, 56.1 | −95.0000 |
| S6 | aspheric | 6.2545 | 0.7806 | | −90.3917 |
| S7 | aspheric | 58.9771 | 0.6876 | 1.67, 20.4 | −1.5912 |
| S8 | aspheric | −4.1354 | 0.3050 | | 3.1898 |
| S9 | aspheric | −2.3613 | 0.3200 | 1.54, 55.9 | −0.2720 |
| S10 | aspheric | 4.1684 | 0.8177 | | −92.5550 |
| S11 | spherical | infinite | | | |

Table 15 below shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S10 of the aspheric lenses in this embodiment.

TABLE 15

| surface number | A4 | A6 | A8 | A10 | A12 |
|---|---|---|---|---|---|
| S1 | −1.3720E−02 | −2.3759E−02 | 4.0081E−02 | 9.0103E−03 | −3.6026E−01 |
| S2 | −1.2391E−02 | 1.3392E−01 | −7.5285E−01 | 3.0691E+00 | −7.6206E+00 |
| S3 | −4.0754E−02 | −1.4725E−01 | 3.2785E+00 | −2.2022E+01 | 8.9214E+01 |
| S4 | −5.1199E−02 | 8.3579E−01 | −8.2620E+00 | 6.2062E+01 | −2.9095E+02 |
| S5 | −5.0179E−03 | −3.0827E−01 | 1.1979E+00 | −2.5789E+00 | 3.7568E+00 |
| S6 | −4.1769E−02 | −1.1706E−01 | 3.8801E−01 | −5.4209E−01 | 5.3851E−01 |
| S7 | 3.6573E−02 | −1.5707E−01 | −8.7908E−04 | 3.5283E−01 | −6.3230E−01 |
| S8 | 2.5074E−01 | −4.5410E−01 | 4.7088E−01 | −3.6484E−01 | 2.1134E−01 |
| S9 | 8.8416E−02 | −2.3072E−01 | 1.4734E−01 | 2.2423E−02 | −6.5686E−02 |
| S10 | −1.2984E−01 | 5.5690E−02 | −4.7351E−02 | 4.7373E−02 | −2.4909E−02 |

| surface number | A14 | A16 | A18 | A20 |
|---|---|---|---|---|
| S1 | 9.2985E−01 | −1.1338E+00 | 6.9156E−01 | −1.7005E−01 |
| S2 | 1.1145E+01 | −8.7770E+00 | 2.8213E+00 | 5.1587E−02 |
| S3 | −2.2822E+02 | 3.5787E+02 | −3.1339E+02 | 1.1719E+02 |
| S4 | 8.5047E+02 | −1.5074E+03 | 1.4818E+03 | −6.1949E+02 |
| S5 | −3.5961E+00 | 2.1549E+00 | −7.3613E−01 | 1.0973E−01 |
| S6 | −3.6498E−01 | 1.6235E−01 | −4.6620E−02 | 6.8043E−03 |
| S7 | 5.4472E−01 | −2.5540E−01 | 6.2686E−02 | −6.3250E−03 |
| S8 | −8.9787E−02 | 2.5940E−02 | −4.4402E−03 | 3.3425E−04 |
| S9 | 3.1673E−02 | −7.1906E−03 | 8.1116E−04 | −3.6737E−05 |
| S10 | 7.1025E−03 | −1.1384E−03 | 9.7182E−05 | −3.4537E−06 |

FIG. 22 shows a longitudinal aberration curve of the camera lens assembly according to Embodiment 5, representing deviations of focal points of light of different wavelengths converged after passing through an optical system. FIG. 23 shows an astigmatic curve of the camera lens assembly according to Embodiment 5, representing a curvature of a tangential image plane and a curvature of a sagittal image plane. FIG. 24 shows a distortion curve of the camera lens assembly according to Embodiment 5, representing amounts of distortion at different viewing angles. FIG. 25 shows a lateral color curve of the camera lens assembly according to Embodiment 5, representing deviations of different image heights on an image plane after light passes through the camera lens assembly. In summary, referring to FIGS. 22-25, it may be seen that the camera lens assembly according to Embodiment 5 has an ultra-thin telephoto lens assembly structure, which may obtain a good image quality and a good processing and manufacturing performance.

Embodiment 6

A camera lens assembly according to Embodiment 6 of the present disclosure is described below with reference to FIGS. 26-30.

Figure 26:
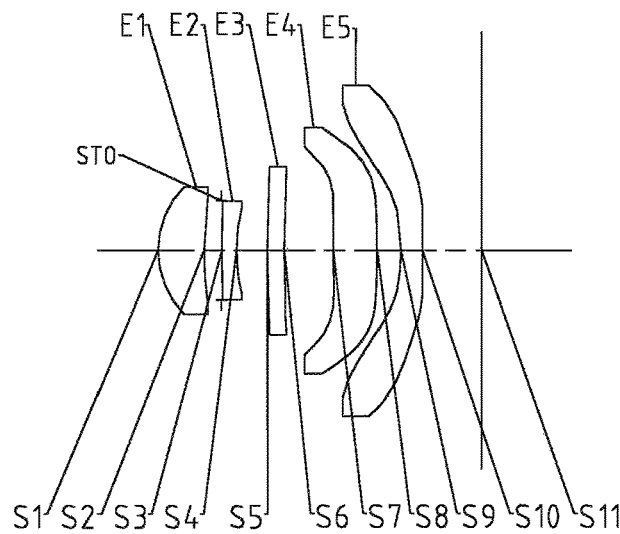
FIG. 26 is a schematic structural diagram illustrating a camera lens assembly according to Embodiment 6.

FIG. 26 is a schematic structural diagram illustrating the camera lens assembly according to Embodiment 6. The camera lens assembly from an object side to an image side sequentially includes a first lens E1, a second lens E2, a third lens E3, a fourth lens E4, and a fifth lens E5.

Table 16 below shows the effective focal lengths f1-f5 of the first to fifth lenses E1-E5, the total effective focal length f of the camera lens assembly, the total track length TTL of the camera lens assembly, and the half of the diagonal length ImgH of the effective pixel area on the image plane.

TABLE 16

| f1(mm) | 3.08 | f(mm) | 5.06 |
|---|---|---|---|
| f2(mm) | −5.59 | TTL(mm) | 4.82 |

TABLE 16-continued

| f3(mm) | 108.15 | ImgH(mm) | 3.24 |
|---|---|---|---|
| f4(mm) | 8.67 | | |
| f5(mm) | −3.97 | | |

Table 17 below shows the surface type, the radius of curvature, the thickness, the refractive index, the abbe number, and the conic coefficient of each lens of the camera lens assembly in this embodiment.

TABLE 17

| surface number | surface type | radius of curvature | thickness | refractive index, abbe number | conic coefficient |
|---|---|---|---|---|---|
| OBJ | spherical | infinite | infinite | | |
| S1 | aspheric | 1.3563 | 0.6861 | 1.55, 56.1 | 0.3359 |
| S2 | aspheric | 5.7618 | 0.2557 | | −21.5824 |
| STO | spherical | infinite | 0.0104 | | |

TABLE 17-continued

| surface number | surface type | radius of curvature | thickness | refractive index, abbe number | conic coefficient |
|---|---|---|---|---|---|
| S3 | aspheric | 27.0134 | 0.2200 | 1.67, 20.4 | −95.0000 |
| S4 | aspheric | 3.2622 | 0.4574 | | 0.4731 |
| S5 | aspheric | 5.7111 | 0.2534 | 1.55, 56.1 | −2.7406 |
| S6 | aspheric | 6.2236 | 0.7311 | | −3.9776 |
| S7 | aspheric | 13.6614 | 0.6486 | 1.67, 20.4 | 16.0983 |
| S8 | aspheric | −9.7996 | 0.3526 | | 9.5179 |
| S9 | aspheric | −2.6423 | 0.3200 | 1.54, 55.9 | −0.2097 |
| S10 | aspheric | 11.4358 | 0.8848 | | 9.1294 |
| S11 | spherical | infinite | | | |

Table 18 below shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S10 of the aspheric lenses in this embodiment.

TABLE 18

| surface number | A4 | A6 | A8 | A10 | A12 |
|---|---|---|---|---|---|
| S1 | −1.2415E−02 | −3.1692E−02 | 4.3873E−02 | 1.4817E−01 | −1.0312E+00 |
| S2 | −8.1198E−03 | 1.4842E−01 | −1.1026E+00 | 5.5359E+00 | −1.6964E+01 |
| S3 | −3.4846E−02 | −2.4848E−01 | 4.2506E+00 | −2.7584E+01 | 1.0951E+02 |
| S4 | −3.5095E−02 | 9.3610E−01 | −9.4885E+00 | 7.3118E+01 | −3.5323E+02 |
| S5 | −1.3888E−01 | −5.6616E−02 | 7.5016E−01 | −2.0671E+00 | 3.4463E+00 |
| S6 | −1.3042E−01 | −6.1618E−04 | 2.6767E−01 | −4.8902E−01 | 5.5099E−01 |
| S7 | 2.8995E−02 | −2.7386E−01 | 3.5809E−01 | −2.6198E−01 | 4.8403E−02 |
| S8 | 2.3260E−01 | −6.3377E−01 | 8.1264E−01 | −7.0778E−01 | 4.2123E−01 |
| S9 | 2.4695E−01 | −8.0229E−01 | 9.2194E−01 | −5.6984E−01 | 2.1398E−01 |
| S10 | −5.0277E−02 | −2.0302E−01 | 2.4773E−01 | −1.3274E−01 | 4.0808E−02 |

| surface number | A14 | A16 | A18 | A20 |
|---|---|---|---|---|
| S1 | 2.4188E+00 | −2.9301E+00 | 1.8270E+00 | −4.6535E−01 |
| S2 | 3.1656E+01 | −3.4511E+01 | 1.9687E+01 | −4.3208E+00 |
| S3 | −2.7669E+02 | 4.3280E+02 | −3.8262E+02 | 1.4633E+02 |
| S4 | 1.0719E+03 | −1.9858E+03 | 2.0519E+03 | −9.0587E+02 |
| S5 | −3.6163E+00 | 2.3242E+00 | −8.3863E−01 | 1.3073E−01 |
| S6 | −3.9592E−01 | 1.7135E−01 | −4.1612E−02 | 4.5851E−03 |
| S7 | 6.4426E−02 | −4.8694E−02 | 1.3401E−02 | −1.3454E−03 |
| S8 | −1.6841E−01 | 4.3212E−02 | −6.4142E−03 | 4.1742E−04 |
| S9 | −5.0424E−02 | 7.3181E−03 | −6.0008E−04 | 2.1334E−05 |
| S10 | −7.7047E−03 | 8.8590E−04 | −5.6971E−05 | 1.5665E−06 |

Figure 27:
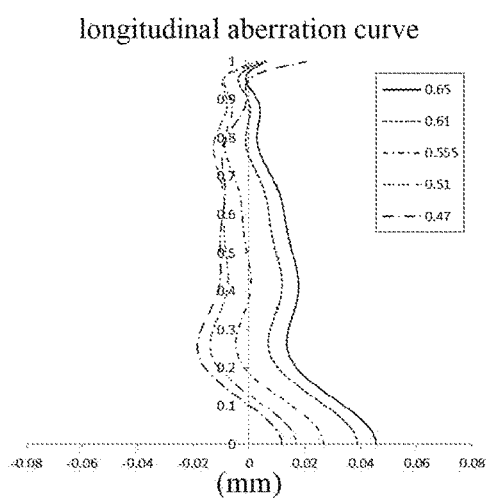
FIGS. 27-30 respectively illustrate a longitudinal aberration curve, an astigmatic curve, a distortion curve and a lateral color curve of the camera lens assembly according to Embodiment 6.
Figure 28:
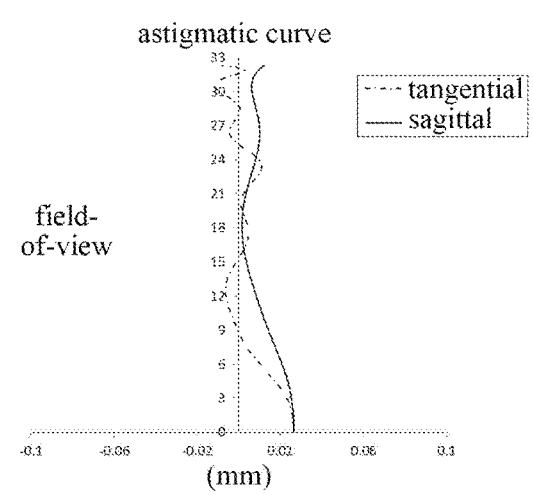
Figure 29:
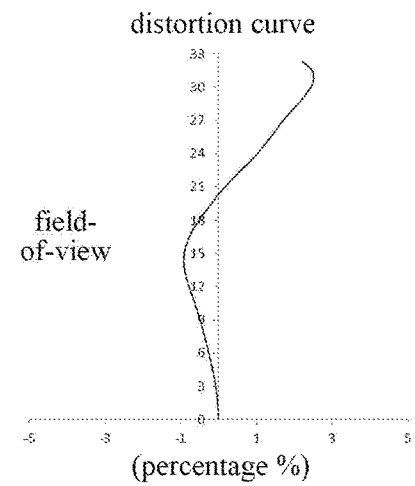
Figure 30:
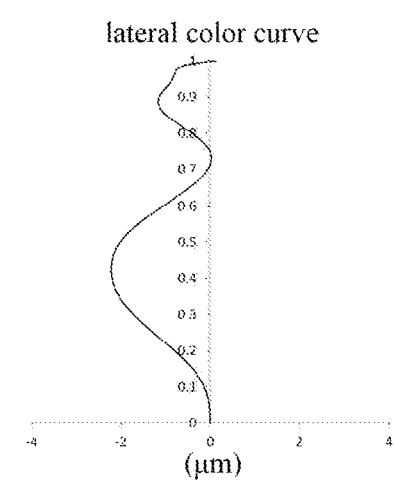

FIG. 27 shows a longitudinal aberration curve of the camera lens assembly according to Embodiment 6, representing deviations of focal points of light of different wavelengths converged after passing through an optical system. FIG. 28 shows an astigmatic curve of the camera lens assembly according to Embodiment 6, representing a curvature of a tangential image plane and a curvature of a sagittal image plane. FIG. 29 shows a distortion curve of the camera lens assembly according to Embodiment 6, representing amounts of distortion at different viewing angles. FIG. 30 shows a lateral color curve of the camera lens assembly according to Embodiment 6, representing deviations of different image heights on an image plane after light passes through the camera lens assembly. In summary, referring to FIGS. 27-30, it may be seen that the camera lens assembly according to Embodiment 6 has an ultra-thin telephoto lens assembly structure, which may obtain a good image quality and a good processing and manufacturing performance.

Embodiment 7

A camera lens assembly according to Embodiment 7 of the present disclosure is described below with reference to FIGS. 31-35.

Figure 31:
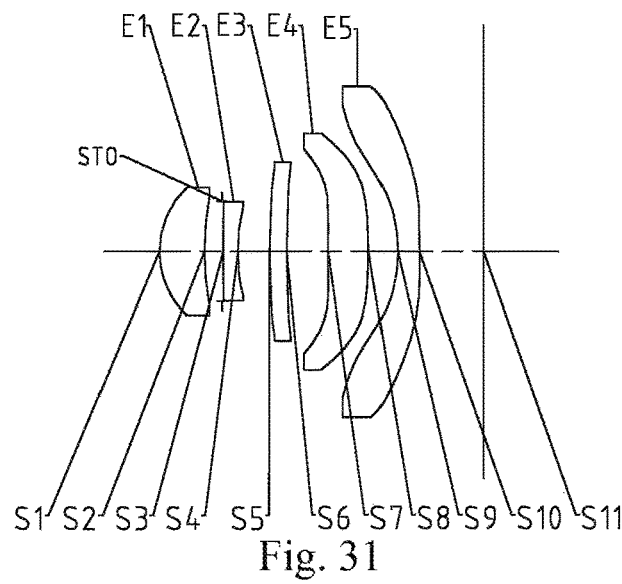
FIG. 31 is a schematic structural diagram illustrating a camera lens assembly according to Embodiment 7.

FIG. 31 is a schematic structural diagram illustrating the camera lens assembly according to Embodiment 7. The camera lens assembly from an object side to an image side sequentially includes a first lens E1, a second lens E2, a third lens E3, a fourth lens E4, and a fifth lens E5.

Table 19 below shows the effective focal lengths f1-f5 of the first to fifth lenses E1-E5, the total effective focal length f of the camera lens assembly, the total track length TTL of the camera lens assembly, and the half of the diagonal length ImgH of the effective pixel area on the image plane.

TABLE 19

| f1(mm) | 3.19 | f(mm) | 5.07 |
|---|---|---|---|
| f2(mm) | −5.99 | TTL(mm) | 4.82 |
| f3(mm) | 127.90 | ImgH(mm) | 3.35 |
| f4(mm) | 8.16 | | |
| f5(mm) | −4.16 | | |

Table 20 below shows the surface type, the radius of curvature, the thickness, the refractive index, the abbe number, and the conic coefficient of each lens of the camera lens assembly in this embodiment.

TABLE 20

| surface number | surface type | radius of curvature | thickness | refractive index, abbe number | conic coefficient |
|---|---|---|---|---|---|
| OBJ | spherical | infinite | infinite | | |
| S1 | aspheric | 1.3200 | 0.6717 | 1.55, 56.1 | 0.3265 |
| S2 | aspheric | 4.4786 | 0.2610 | | −21.2493 |

TABLE 20-continued

| surface number | surface type | radius of curvature | thickness | refractive index, abbe number | conic coefficient |
|---|---|---|---|---|---|
| STO | spherical | infinite | 0.0178 | | |
| S3 | aspheric | 31.8148 | 0.2200 | 1.67, 20.4 | −95.0000 |
| S4 | aspheric | 3.5352 | 0.4712 | | 4.1710 |
| S5 | aspheric | 5.4853 | 0.2544 | 1.55, 56.1 | 4.5315 |
| S6 | aspheric | 5.8554 | 0.6177 | | 1.6902 |
| S7 | aspheric | 18.9346 | 0.5985 | 1.67, 20.4 | 95.0000 |
| S8 | aspheric | −7.5176 | 0.4336 | | −10.7484 |
| S9 | aspheric | −2.6383 | 0.3200 | 1.54, 55.9 | −0.1054 |
| S10 | aspheric | 15.0675 | 0.9542 | | 27.5177 |
| S11 | spherical | infinite | | | |

Table 21 below shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S10 of the aspheric lenses in this embodiment.

TABLE 21

| surface number | A4 | A6 | A8 | A10 | A12 |
|---|---|---|---|---|---|
| S1 | −1.1503E−02 | −5.3300E−02 | 1.7890E−01 | −3.7810E−01 | 2.5822E−01 |
| S2 | −3.2051E−03 | 1.5167E−01 | −1.1836E+00 | 5.9960E+00 | −1.8793E+01 |
| S3 | −6.9092E−02 | −1.8451E−01 | 3.7485E+00 | −2.3724E+01 | 9.0730E+01 |
| S4 | −5.7928E−02 | 8.8463E−01 | −8.4951E+00 | 6.5434E+01 | −3.1442E+02 |
| S5 | −1.3510E−01 | −3.2397E−03 | 4.6428E−01 | −1.0161E+00 | 1.2029E+00 |
| S6 | −1.3767E−01 | 7.2383E−02 | −2.8246E−02 | 2.9756E−01 | −6.6691E−01 |
| S7 | −2.1071E−02 | −1.4768E−01 | 1.4033E−01 | 2.5761E−02 | −2.5391E−01 |
| S8 | 5.5091E−02 | −2.0465E−01 | 2.0499E−01 | −1.3492E−01 | 5.3641E−02 |
| S9 | −5.0984E−02 | −2.1286E−02 | 2.5514E−02 | 1.0047E−04 | −4.5851E−03 |
| S10 | −1.5110E−01 | 1.0467E−01 | −7.0582E−02 | 4.0665E−02 | −1.6018E−02 |

| surface number | A14 | A16 | A18 | A20 |
|---|---|---|---|---|
| S1 | 4.2271E−01 | −1.0412E+00 | 8.3013E−01 | −2.4080E−01 |
| S2 | 3.6766E+01 | −4.3397E+01 | 2.8113E+01 | −7.6228E+00 |
| S3 | −2.1918E+02 | 3.2535E+02 | −2.7125E+02 | 9.7406E+01 |
| S4 | 9.4493E+02 | −1.7285E+03 | 1.7604E+03 | −7.6530E+02 |
| S5 | −8.4517E−01 | 3.3182E−01 | −5.8111E−02 | 1.2580E−03 |
| S6 | 7.0592E−01 | −4.1309E−01 | 1.2900E−01 | −1.6790E−02 |
| S7 | 3.0230E−01 | −1.6773E−01 | 0.04564952 | −0.004906814 |
| S8 | −1.1934E−02 | 1.9230E−03 | −4.4042E−04 | 6.3574E−05 |
| S9 | 1.6465E−03 | −2.6032E−04 | 1.9378E−05 | −5.2478E−07 |
| S10 | 3.9485E−03 | −5.8148E−04 | 4.6832E−05 | −1.5907E−06 |

Figures 32, 33:
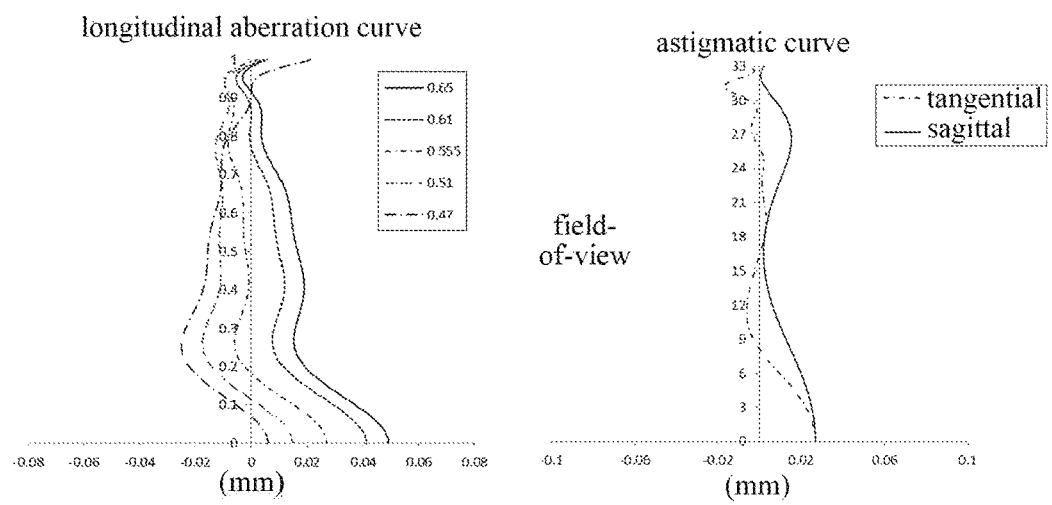
FIGS. 32-35 respectively illustrate a longitudinal aberration curve, an astigmatic curve, a distortion curve and a lateral color curve of the camera lens assembly according to Embodiment 7.
Figures 34, 35:
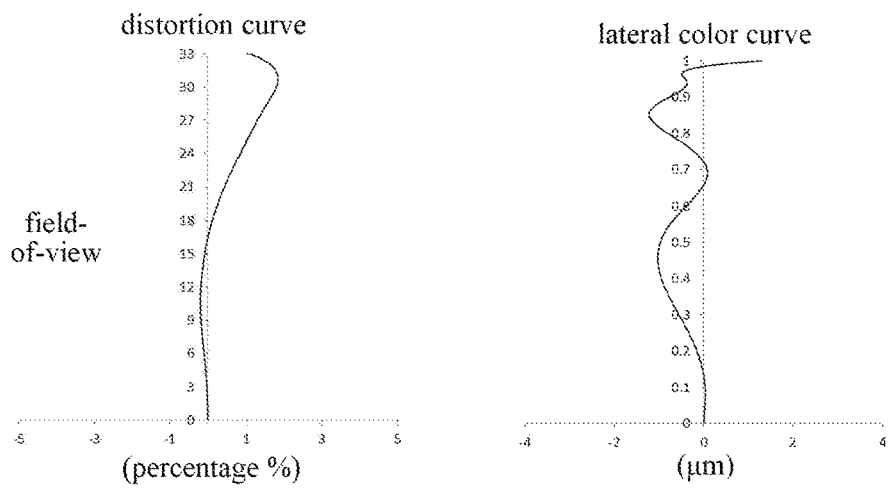

FIG. 32 shows a longitudinal aberration curve of the camera lens assembly according to Embodiment 7, representing deviations of focal points of light of different wavelengths converged after passing through an optical system. FIG. 33 shows an astigmatic curve of the camera lens assembly according to Embodiment 7, representing a curvature of a tangential image plane and a curvature of a sagittal image plane. FIG. 34 shows a distortion curve of the camera lens assembly according to Embodiment 7, representing amounts of distortion at different viewing angles. FIG. 35 shows a lateral color curve of the camera lens assembly according to Embodiment 7, representing deviations of different image heights on an image plane after light passes through the camera lens assembly. In summary, referring to FIGS. 32-35, it may be seen that the camera lens assembly according to Embodiment 7 has an ultra-thin telephoto lens assembly structure, which may obtain a good image quality and a good processing and manufacturing performance.

To sum up, in the above Embodiments 1-7, the conditional formulas satisfy the conditions shown in Table 22 below.

| Formula | Embodiment | | | | | | |
|---|---|---|---|---|---|---|---|
| | 1 | 2 | 3 | 4 | 5 | 6 | 7 |
| f*tan(HFOV) | 3.1 | 3.2 | 3.2 | 3.1 | 3.1 | 3.2 | 3.4 |
| f4/|f3| | 0.13 | 0.004 | 0.001 | 0.13 | 0.11 | 0.08 | 0.06 |
| TTL/ImgH | 1.50 | 1.49 | 1.49 | 1.54 | 1.49 | 1.49 | 1.44 |
| f/f45 | −0.82 | −0.58 | −0.59 | −0.73 | −0.84 | −0.61 | −0.51 |
| f/CT4 | 7.64 | 7.78 | 7.76 | 8.20 | 7.36 | 7.81 | 8.46 |
| f/|R7| | 0.08 | 0.42 | 0.41 | 0.14 | 0.09 | 0.37 | 0.27 |
| CT3/ET3 | 0.99 | 1.01 | 1.02 | 1.01 | 0.97 | 0.99 | 1.02 |

-continued

| Formula | Embodiment | | | | | | |
|---|---|---|---|---|---|---|---|
| | 1 | 2 | 3 | 4 | 5 | 6 | 7 |
| f/|f3| | 0.11 | 0.002 | 0.001 | 0.11 | 0.10 | 0.05 | 0.04 |
| f1/f5 | −1.04 | −0.75 | −0.75 | −0.97 | −1.06 | −0.78 | −0.77 |
| BFL | 0.84 | 0.86 | 0.86 | 0.88 | 0.82 | 0.88 | 0.95 |
| T34 | 0.79 | 0.77 | 0.78 | 0.82 | 0.78 | 0.73 | 0.62 |
| TTL/f | 0.95 | 0.95 | 0.95 | 0.95 | 0.95 | 0.95 | 0.95 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to) technical features with similar functions.

What is claimed is:

1. A camera lens assembly, comprising, sequentially from an object side to an image side, a first lens, a second lens, a third lens, a fourth lens, and a fifth lens, wherein,
   the first lens has a positive refractive power, and an object-side surface of the first lens is a convex surface;
   the second lens has a negative refractive power, an object-side surface of the second lens is a convex surface at a paraxial position, and an image-side surface of the second lens is a concave surface;
   the third lens has a positive refractive power or a negative refractive power;
   the fourth lens has a positive refractive power;
   the fifth lens has a negative refractive power, and an object-side surface of the fifth lens is a concave surface at a paraxial position;
   a center thickness CT3 of the third lens and an edge thickness ET3 of the third lens at a maximum radius satisfy: $0.8 < CT3/ET3 \leq 1.2$;
   an effective focal length f of the camera lens assembly and a combined focal length f45 of the fourth lens and the fifth lens satisfy: $-1.0 < f/f45 \leq -0.5$;
   the effective focal length f of the camera lens assembly and a center thickness CT4 of the fourth lens satisfy: $7 < f/CT4 < 9$;
   the effective focal length f of the camera lens assembly and half of a maximal field-of-view HFOV of the camera lens assembly satisfy: $f*\tan(HFOV) \geq 3.1$ mm; and
   an axial distance BPL from an image-side surface of the filth lens to an image plane satisfies: $0.75$ mm $\leq BFL \leq 0.95$ mm.

2. The camera lens assembly according to claim 1, wherein an effective focal length f3 of the third lens and an effective focal length f4 of the fourth lens satisfy: $f4/|f3| \leq 0.2$.

3. The camera lens assembly according to claim 1, wherein an axial distance TTL from an object-side surface of the first lens to an image plane and half of a diagonal length ImgH of an effective pixel area on the image plane satisfy: $TTL/ImgH \leq 1.6$.

4. The camera lens assembly according to claim 3, wherein the effective focal length f of the camera lens assembly and a center thickness CT4 of the fourth lens satisfy: $7.64 < f/CT4 < 9$.

5. The camera lens assembly according to claim 1, wherein the effective focal length f of the camera lens assembly and an effective focal length f3 of the third lens satisfy: $f/|f3| < 0.2$.

6. A camera lens assembly, comprising, sequentially from an object side to an image side, a first lens, a second lens, a third lens, a fourth lens, and a fifth lens, wherein,
   the first lens has a positive refractive power, and an object-side surface of the first lens is a convex surface;
   the second lens has a negative refractive power, an object-side surface of the second lens is a convex surface at a paraxial position, and an image-side surface of the second lens is a concave surface;
   the third lens has a positive refractive power or a negative refractive power;
   the fourth lens has a positive refractive power;
   the fifth lens has a negative refractive power, and an object-side surface of the fifth lens is a concave surface at a paraxial position;
   a center thickness CT3 of the third lens and an edge thickness ET3 of the third lens at a maximum radius satisfy: $0.8 < CT3/ET3 \leq 1.2$;
   an effective focal length f of the camera lens assembly and a center thickness CT4 of the fourth lens satisfy: $7 < f/CT4 < 9$;
   the effective focal length f of the camera lens assembly and half of a maximal field-of-view HFOV of the camera lens assembly satisfy: $f*\tan(HFOV) \geq 3.1$ mm, and
   an axial distance BFL from an image-side surface of the fifth lens to an image plane satisfies: $0.75$ mm $\leq BFL \leq 0.95$ mm.

7. The camera lens assembly according to claim 6, wherein an effective focal length f3 of the third lens and an effective focal length f4 of the fourth lens satisfy: $f4/|f3| \leq 0.2$.

8. The camera lens assembly according to claim 6, wherein an axial distance TTL from the object-side surface of the first lens to an image plane and half of a diagonal length ImgH of an effective pixel area on the image plane satisfy: $TTL/ImgH \leq 1.6$.

9. The camera lens assembly according to claim 6, wherein the effective focal length f of the camera lens assembly and a center thickness CT4 of the fourth lens satisfy: $7.64 < f/CT4 < 9$.

10. The camera lens assembly according to claim 6, wherein the effective focal length f of the camera lens assembly and the effective focal length f3 of the third lens satisfy: $f/|f3| < 0.2$.

11. A camera lens assembly, comprising, sequentially from an object side to an image side, a first lens, a second lens, a third lens, a fourth lens, and a fifth lens, wherein, the first lens has a positive refractive power, and an object-side surface of the first lens is a convex surface;

the second lens has a negative refractive power, an object-side surface of the second lens is a convex surface at a paraxial position, and an image-side surface of the second lens is a concave surface;

the third lens has a positive refractive power or a negative refractive power;

the fourth lens has a positive refractive power;

the fifth lens has a negative refractive power, and an object-side surface of the fifth lens is a concave surface at a paraxial position;

a center thickness CT3 of the third lens and an edge thickness ET3 of the third lens at a maximum radius satisfy: 0.8<CT3/ET3<1.2;

an effective focal length f of the camera lens assembly and an axial distance TTL from the object-side surface of the first lens to an image plane satisfy: TTL/f<1.0;

the effective focal length f of the camera lens assembly and a center thickness CT4 of the fourth lens satisfy: 7<f/CT4<9;

the effective focal length f of the camera lens assembly and half of a maximal field-of-view HFOV of the camera lens assembly satisfy: f*tan(HFOV)≥3.1 mm; and an axial distance BPL from an image-side surface of the filth lens to an image plane satisfies: 0.75 mm≤BFL≤0.95 mm.

12. The camera lens assembly according to claim 11, wherein an effective focal length f3 of the third lens and an effective focal length f4 of the fourth lens satisfy: f4/|f3|≤0.2.

13. The camera lens assembly according to claim 11, wherein the axial distance TTL from the object-side surface of the first lens to the image plane and half of a diagonal length ImgH of an effective pixel area on the image plane satisfy: TTL/ImgH≤1.6.

14. The camera lens assembly according to claim 11, wherein the effective focal length f of the camera lens assembly and a center thickness CT4 of the fourth lens satisfy: 7.64<f/CT4<9.

15. The camera lens assembly according to claim 11, wherein the effective focal length f of the camera lens assembly and the effective focal length f3 of the third lens satisfy: f/|f3|<0.2.

* * * * *